(12) United States Patent
Meskens et al.

(10) Patent No.: US 9,233,768 B2
(45) Date of Patent: Jan. 12, 2016

(54) METHOD OF REJECTING A DEFECTIVE UNIT DOSE POUCH FROM A MANUFACTURING LINE

(75) Inventors: Stefan Meskens, Londerzeel (BE); Kerry Brian Johnson, Jackson, TN (US); Leon Byrd, Jr., Belleville, IL (US); Suzanne Khalaf, Brussels (BE)

(73) Assignee: The Procter & Gamble Company, Cincinnati, OH (US)

( * ) Notice: Subject to any disclaimer, the term of this patent is extended or adjusted under 35 U.S.C. 154(b) by 638 days.

(21) Appl. No.: 13/406,127

(22) Filed: Feb. 27, 2012

(65) Prior Publication Data
US 2013/0219996 A1    Aug. 29, 2013

(51) Int. Cl.
| | |
|---|---|
| *B65B 9/04* | (2006.01) |
| *B65B 57/02* | (2006.01) |
| *G01M 3/26* | (2006.01) |
| *G01M 3/02* | (2006.01) |

(52) U.S. Cl.
CPC ............... *B65B 9/042* (2013.01); *B65B 57/02* (2013.01); *G01M 3/025* (2013.01); *G01M 3/26* (2013.01)

(58) Field of Classification Search
CPC .......... G01M 3/26; G01M 3/02; G01M 3/025
USPC ............... 348/162, E05.09; 209/509, 552; 73/40.7, 41, 45, 45.1, 45.2, 45.4, 40
See application file for complete search history.

(56) References Cited

U.S. PATENT DOCUMENTS

| | | | |
|---|---|---|---|
| 3,942,900 A | 3/1976 | Garris | |
| 5,281,826 A * | 1/1994 | Ivancic et al. | ............... 250/461.1 |
| 5,363,968 A | 11/1994 | Soloman | |
| 5,515,159 A | 5/1996 | Sites et al. | |
| 5,568,715 A | 10/1996 | Ebel et al. | |
| 6,351,984 B1 | 3/2002 | Srinivasan | |
| 2005/0050451 A1 | 3/2005 | Abdollahi et al. | |
| 2007/0296963 A1 | 12/2007 | Parker et al. | |
| 2010/0115887 A1 | 5/2010 | Schroeder et al. | |
| 2010/0276344 A1* | 11/2010 | Yamada et al. | ................ 209/552 |
| 2011/0188784 A1* | 8/2011 | Denome et al. | .................... 383/1 |
| 2011/0257063 A1* | 10/2011 | Lant | .............................. 510/305 |
| 2014/0200701 A1 | 1/2014 | Kent et al. | |

FOREIGN PATENT DOCUMENTS

| | | |
|---|---|---|
| CN | 1 910 433 A | 2/2007 |
| JP | 2004 028604 A | 1/2004 |
| WO | WO 2007/134632 A1 | 11/2007 |

OTHER PUBLICATIONS

Search Report Dated Jun. 6, 2013; 11 Pages.
U.S. Appl. No. 13/406,254, filed Feb. 27, 2012, Khalaf, et al.
U.S. Appl. No. 13/405,694, filed Feb. 27, 2012, Corominas, et al.

* cited by examiner

*Primary Examiner* — Hezron E Williams
*Assistant Examiner* — Rodney T Frank
(74) *Attorney, Agent, or Firm* — Gregory S. Darley-Emerson; Leonard W. Lewis; Steven W. Miller (57) ABSTRACT

An in-line method of rejecting composition-filled pouches having a defect such as a leak comprises inspecting a first composition-filled pouch. If a leak is detected, that pouch is rejected from the manufacturing process. The pouch adjacent to the leak is also rejected.

6 Claims, 6 Drawing Sheets

METHOD OF REJECTING A DEFECTIVE UNIT DOSE POUCH FROM A MANUFACTURING LINE

FIELD OF THE INVENTION

The present disclosure relates to a method for rejecting defective composition-filled pouches from a pouch converting line.

BACKGROUND OF THE INVENTION

Water-soluble polymeric films are commonly used as packaging materials to simplify dispersing, pouring, dissolving and dosing of a material to be delivered. For example, pouches made from water-soluble film are commonly used to package household care compositions such as laundry or dish detergent. A consumer can directly add the pouched composition to a mixing vessel, such as a bucket, sink or washing machine.

Composition-filled water-soluble pouches or "unit dose pouches" may be manufactured on high-speed production lines. The production lines typically comprise a series of steps or stations at which different portions of the unit dose pouch are made and/or modified. These steps are often accomplished at the highest possible speed in order to achieve high output and low production costs. Yet, it remains desirable to maintain certain quality standards for the finished product. As such, high-speed production lines typically include a means of inspecting the unit dose pouches.

The high-speed manufacture of unit dose pouches requires precision in forming and sealing the water-soluble films together to form filled pouches. If problems arise, including, but not limited to, those related to film indexing or timing of the filling and sealing, then leaky unit dose pouches may be formed. One current means of inspecting leaky unit dose pouches involves their collection at the end of the pouch converting line. The unit dose pouches are collected into a hopper, which is then inspected for contamination by the pouch composition. However, if a leak is found at this point in the production process, a large number of leaky unit dose pouches may have already been produced. This can be particularly problematic when a liquid composition leaks onto a neighboring water-soluble pouch since it may cause premature degradation of the neighboring pouch. Moreover, if a leak is found, the entire production line may need to be shut down for decontamination.

SUMMARY OF THE INVENTION

The present disclosure addresses the aforementioned issues by providing an in-line method of rejecting unit dose pouches having a defect from a pouch converting line. The unit dose pouch converting line comprises a platen having a surface. The platen comprises a plurality of pouch cavities in the surface of the platen. Each of the pouch cavities is surrounded by a plurality of platen edges. The cavities are arranged in lanes and rows such that the location of each cavity is defined by a single lane, L disposed between Lane L−1 and Lane L+1, and a single row, R disposed between row R−1 and Row R+1. Each cavity in combination with the plurality of platen edges defines an area comprising at least four zones selected from the group of: Top Zone adjacent to Row R−1; Bottom Zone adjacent to R+1, a Left Zone adjacent to L−1; and a Right Zone adjacent to L+1.

The disclosed method comprises the step of inspecting, using any suitable means, a first composition-filled pouch located in the cavity at lane, L, row, R for a defect in at least one of the four zones, such that if a defect is detected in:

i. the Top Zone, the first composition-filled pouch is rejected and a second composition-filled pouch if present in a cavity at Lane, L, row, R−1 is rejected;
ii. the Bottom Zone, the first composition-filled pouch is rejected and a second composition-filled pouch if present in a cavity at Lane, L, row R+1 is rejected;
iii. the Left Zone, the first composition-filled pouch is rejected and a second composition-filled pouch if present in a cavity at Lane, L−1, row, R is rejected;
iv. the Right Zone, the first composition-filled pouch is rejected and a second composition-filled pouch if present in a cavity at Lane, L+1, row, R is rejected.

BRIEF DESCRIPTION OF THE DRAWINGS

The present disclosure may be more readily understood with reference to the appended drawing figures where.

The patent or application file contains at least one drawing executed in color. Copies of this patent or patent application publication with color drawings will be provided by the office upon request and payment of the necessary fee.

DETAILED DESCRIPTION OF THE INVENTION

"Comprising" as used herein means that various components, ingredients or steps can that be conjointly employed in practicing the present disclosure. Accordingly, the term "comprising" encompasses the more restrictive terms "consisting essentially of" and "consisting of". The present compositions can comprise, consist essentially of, or consist of any of the required and optional elements disclosed herein.

"Composition-filled" as used herein encompasses both a partially composition-filled pouch and a pouch filled to capacity.

Unit Dose Pouches
Manufacturing Process

Unit dose pouches are made using suitable equipment and methods. For example, unit dose pouches are made using vertical form filling, horizontal form filling, and/or rotary drum filling techniques commonly known in the art. Such processes may be either continuous or intermittent. Examples of continuous in-line processes of manufacturing water-soluble containers are set forth in U.S. Pat. No. 7,125,828, U.S. 2009/0199877A1, EP 2380965, EP 2380966, U.S. Pat. No. 7,127,874 and U.S.2007/0241022 (all to Procter & Gamble Company, Ohio, USA). Examples of non-continuous in-line processes of manufacturing water-soluble containers are set forth in U.S. Pat. No. 7,797,912 (to Reckitt Benckiser, Berkshire, GB). Each of these processes may utilize a platen comprising a plurality of mold cavities.

Generally, the process may comprise the following steps. A film is heated and/or wetted and fed onto the surface of the platen. Once on the surface of the platen, the film can be held in position by any means. For example, the film can be held in position through the application of vacuum on the film, thus pulling the film in a fixed position on the surface. The vacuum may be applied along the edges of the film and/or on the surface area between the mold cavities. The platen surface may have at least some holes connected to a unit which can provide a vacuum as is known in the art.

Any film that is suitable for making a unit dose pouch is used. Non-limiting examples of water-soluble films that are used include those comprising polyvinyl alcohol as described in: U.S. 2011/0204087A1 and U.S. 2011/0188784A1 (each to Procter & Gamble Company, Ohio, USA). Further non-limiting examples include commercially available films including: M8630 and M8900 as sold by MonoSol (Gary, Ind., USA) and/or films under the Solublon® line which are supplied by Aicello (North Vancouver, BC, Canada) or the Poval film line supplied by Kuraray (Houston, Tex., USA).

Once open pockets of film are formed into the mold cavities, they may be filled with composition and sealed by any known method, including those described in the patent publications listed above. The sealing step typically is accomplished by sealing a second water-soluble film to the open top of the pocket. In some embodiments, the second water-soluble film may itself form a portion of one or more composition containing pockets. Non-limiting filling and sealing means are described Non-limiting filling and sealing means are described in U.S. Pat. No. 6,995,126, U.S. Pat. No. 7,125,828, U.S. 2009/0199877A1, EP 2380965, EP 2380966, U.S. Pat. No. 7,127,874 and U.S.2007/0241022 (all to Procter & Gamble Company, Ohio, USA).

Composition

The unit dose pouches may contain any composition that is suitable for an intended use. Non-limiting examples of useful compositions include light duty and heavy duty liquid detergent compositions, hard surface cleaning compositions, detergent gels commonly used for laundry, and bleach and laundry additives, shampoos, body washes, and other personal care compositions. The compositions may take the form of a liquid, gel, solid or a powder. Liquid and gel compositions may comprise a solid. Solids may include powder or agglomerates, such as micro-capsules, beads, noodles or one or more pearlized balls or mixtures thereof.

Compositions useful in the present disclosure may comprise a photosensitive compound or other agent that makes leakage more visible to a machine vision system or to the naked eye.

Platen

Typical unit dose manufacturing lines utilize a surface containing the mold cavity for each compartment that forms the unit dose pouch. Often, the surface is removably connected to a moving, rotating belt, for example a conveyer belt or platen conveyer belt. The movement of the belt may be continuous or intermittent. The surface can be removed as needed and replaced with another surface having other dimensions or comprising moulds of a different shape or dimension. This allows the equipment to be cleaned easily and to be used for the production of different types of unit dose pouches. Any useful surface may be used.

Figure 1:
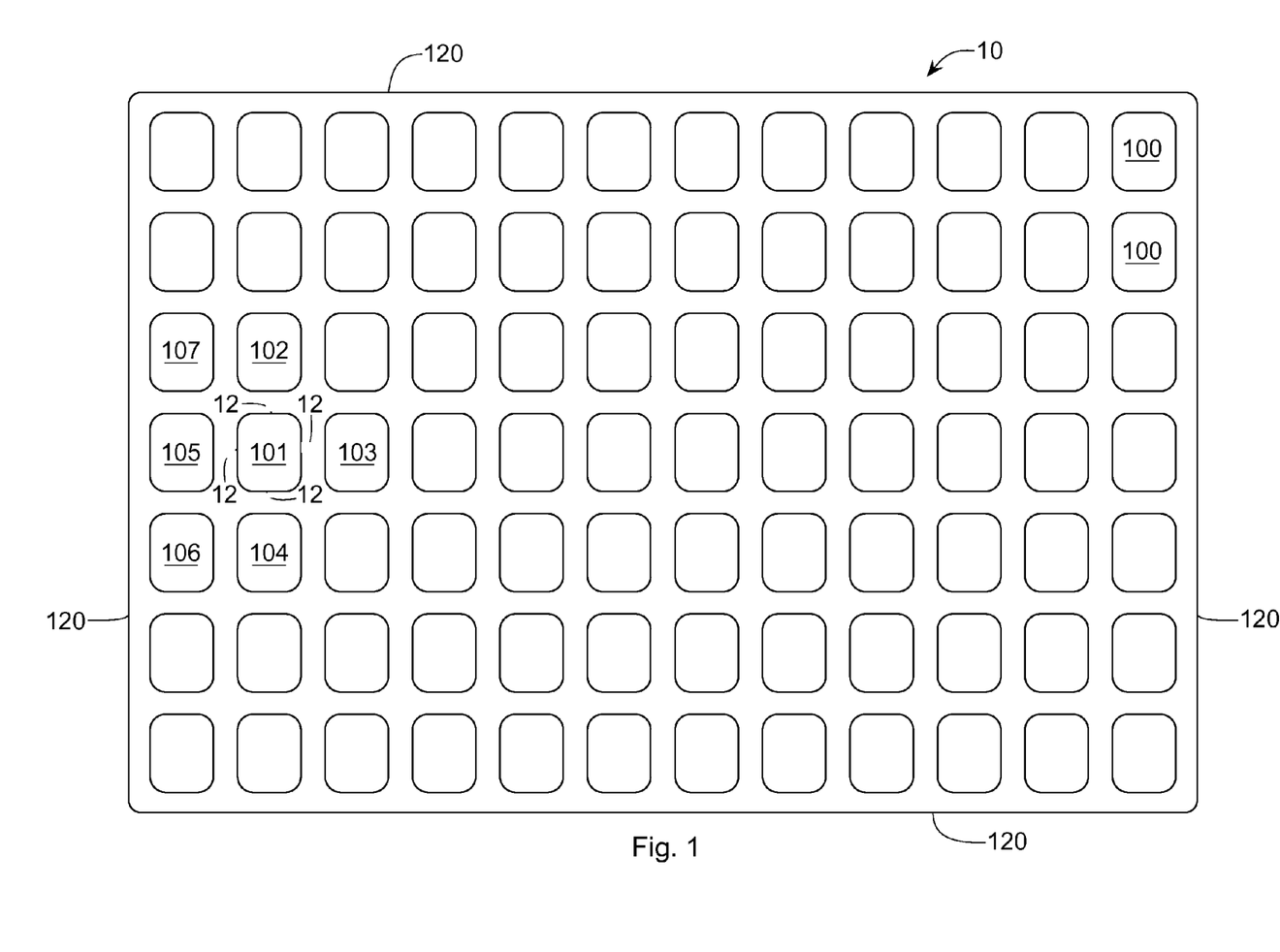
FIG. 1 is a plan view of a section of a platen useful in the present disclosure.

Referring now to FIG. 1, one embodiment of a platen 10 of use is shown. In FIG. 1, a plurality of mold cavities 100 are present in a 2-D array on the surface of the platen 10. In this embodiment there are 12 mold cavities in the machine direction of the platen and 7 mold cavities in the cross-machine direction. Each cavity may be defined by a Row, "R," in the cross machine direction and a Lane, "L," in the machine direction. It follows that since there is a plurality of mold cavities on the surface of the platen that each cavity has at least two neighboring cavities except for those mold cavities directly adjacent to one the four edges of the platen itself 120. For example cavity 101 in FIG. 1 has four neighboring cavities, 102, 103, 104 and 105, whereas cavity 105, which is on the edge 120 of the platen itself, has only two neighboring cavities 101, 106 and 107. Between the cavity 101 and each of its four neighboring cavities are four cavity platen edges 12 adjacent to the cavity.

Figure 2:
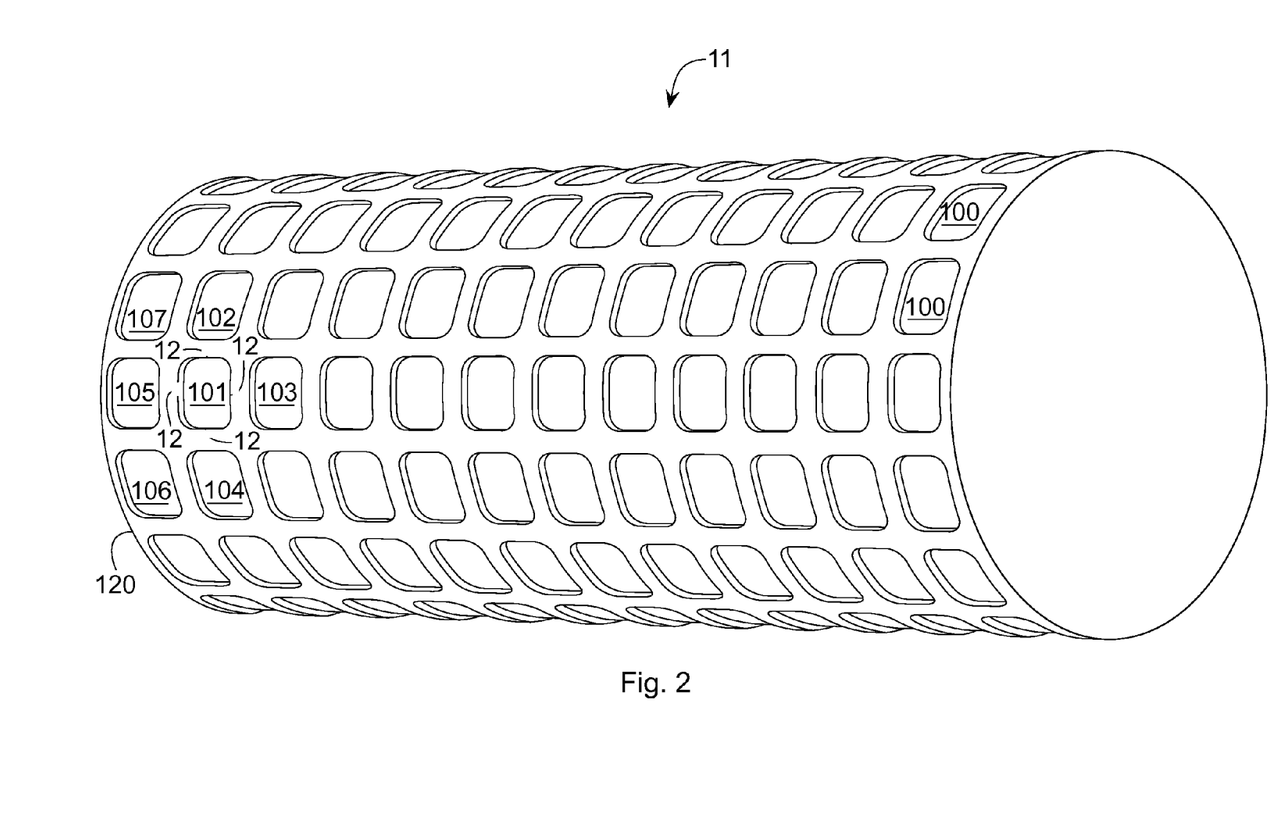
FIG. 2 is a plan view of a section of a platen useful in the present disclosure.

FIG. 2 depicts another useful embodiment of a platen 10. The mold cavities 100 are located on the curved surface of a drum 11. Like the platen described above, there are a plurality of mold cavities on the surface of the drum, such that each cavity has at least one neighboring cavity.

Unit Dose Pouch Configuration

Single or multi-compartment pouches may be made utilizing the mold cavities such as those described above. Non-limiting examples of single compartment pouches and methods of making them are those that are presently on the market under the names All Mighty Pacs, Purex Ultra Packs, Persil, OMO Pods, Tesco Capsules, Arm & Hammer Crystal Power Pacs. Non-limiting examples of multi-compartment pouches and methods of making unit dose pouches are described in U.S. 2010/0192986A1, U.S. Pat. No. 6,995,126, U.S. Pat. No. 7,125,828, U.S. Pat. No. 7,127,874, U.S. Pat. No. 7,964,549, U.S. 2009/0199877A1, U.S. Pat. No. 6,881,713, U.S. Pat. No. 7,013,623, U.S. Pat. No. 7,528,099, and U.S. Pat. No. 6,727,215 (each to the Procter & Gamble Company, Ohio, USA). Tide Pods and Ariel Pods are examples of multi compartment pouches that are currently on the market.

Figure 3:
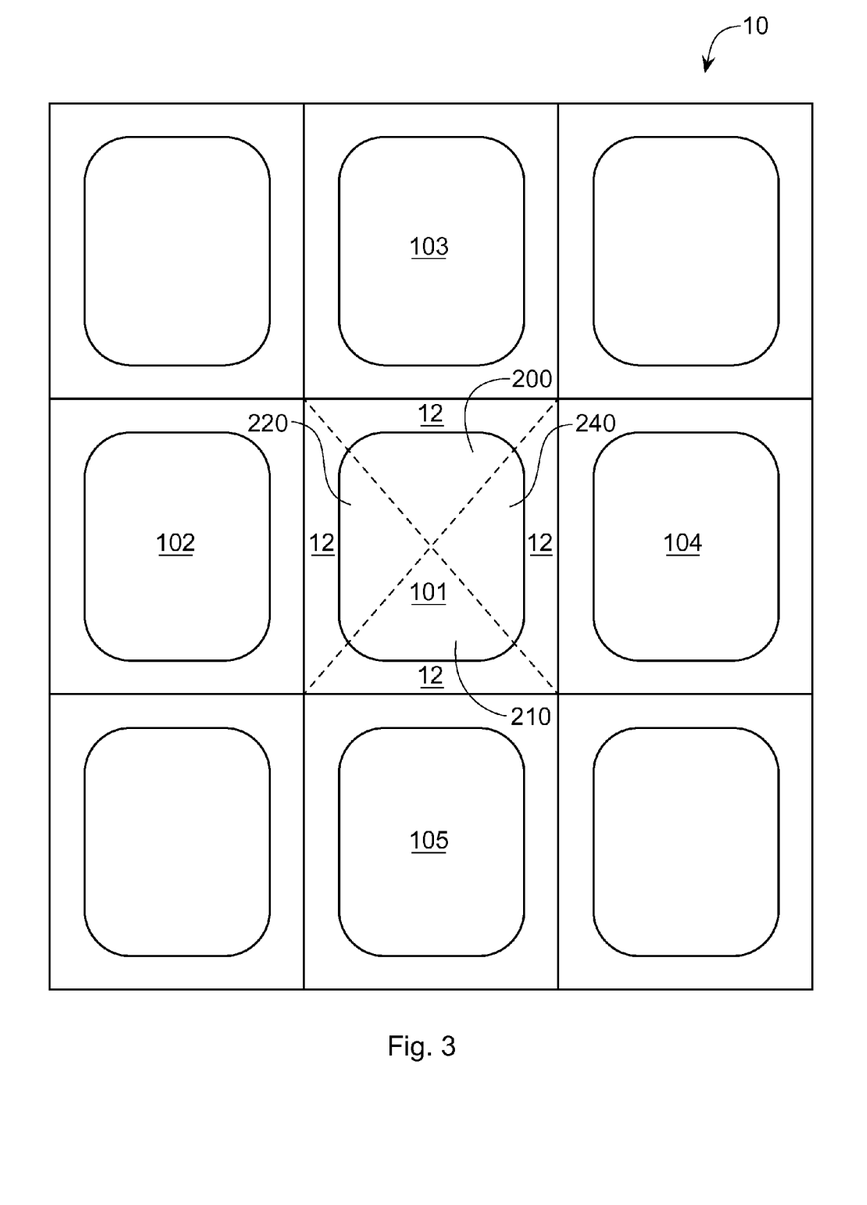
FIG. 3 is a schematic illustration of the Zones of a composition-filled pouch.

FIG. 3 is a graphic illustration of a portion of the platen 10 in FIG. 2. The top surface of the platen is viewed from above. A cavity 101 is visible in the middle of the platen 10. As noted above, a given cavity may be defined by a Row, "R," in the machine direction of the platen and a Lane, "L," in the cross machine direction of the platen. The cavity 101 and the surrounding platen edges 12 are defined by four zones each of which are bound by a triangle formed from two dotted lines which each intersect with each other and one solid line. The four zones include: a Top Zone 200, a Bottom Zone 210, a Left Zone 220 and a Right Zone 240. Adjacent to each of these zones is a neighboring cavity. The cavity 103 adjacent to the Top Zone 200 is defined by the Lane, "L," and the Row, "R−1." The cavity 105 adjacent to the Bottom Zone 201 is defined by the Lane, "L," and the Row, "R+1." The cavity 102 adjacent to the Left Zone 220 is defined by the Lane, "L−1," and the Row "R." The cavity 104 adjacent to the Right Zone 240 is defined by the Lane "L+1," and the Row "R."

Methods of Inspection

Any useful means of inspection of the unit dose pouches for defects while they are present in the cavity of a platen may be utilized. In our co-pending application entitled "Apparatus and Method for Detecting Leakage from a Composition-Containing Pouch," we describe a machine vision method and apparatus for inspecting unit dose pouches during the pouch production process. This process includes lacing the composition with a compound that is visible to a machine vision system. A leaking unit dose pouch is detected when the composition is present outside of the pouch on at least one of the platen edges surrounding the cavity in which a unit dose pouch is located.

Pouch Rejection Strategy

Figure 4:
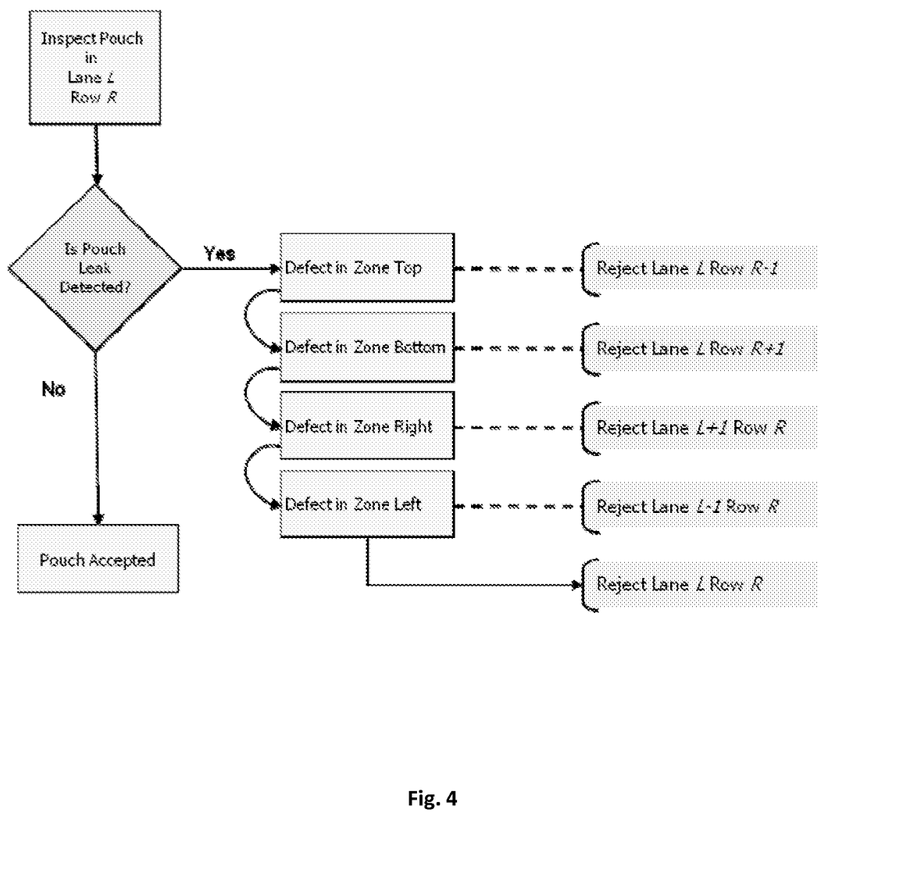
FIG. 4 is a block diagram of a pouch rejection strategy.

Referring now to FIG. 4, a block diagram of the pouch rejection strategy is shown. The cavity in Lane L, Row R containing a unit dose pouch and its adjacent platen edges are inspected for leakage. If a pouch leak is not detected, then the pouch is accepted by the system. If a pouch leak is detected, then the leaky unit dose pouch and a pouch adjacent to the leaky pouch are rejected. More specifically, if a leak is detected in the Top Zone of the unit dose pouch, then that pouch and the pouch located at Lane L, Row R−1 is also rejected. If a leak is detected in the Bottom Zone of the unit dose pouch, then that pouch and the pouch located at Lane L, Row R+1 is also rejected. If a leak is detected in the Left Zone of the unit dose pouch, then that pouch and the pouch located at Lane L−1, Row R is also rejected. If a leak is detected in the Right Zone of the unit dose pouch, then that pouch and the pouch located at Lane L+1, Row R is also rejected.

Examples

Figure 5:
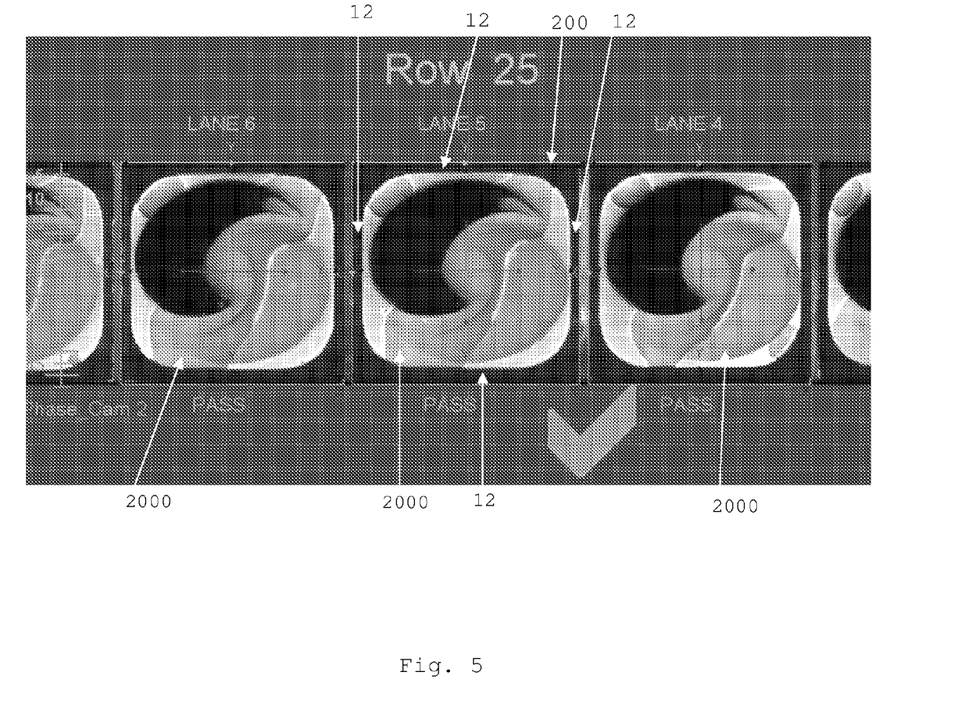
FIG. 5 is a picture of a row of pouches that have passed inspection.

FIG. 5 shows an image captured by a camera that is located along a unit dose pouch production line 200. The image is a view from above of a portion of a platen 10 with three cavities (not visible) which each contain a multi compartment unit dose pouch 100. The platen 10 is being exposed to ultra violet light when the image is captured. The composition 2000 in each of the unit dose pouches 100 is laced with 50 parts per million of C.I. Fluorescent Brightener 351(which is also known as 4,4'-BIS(2-DISULFONIC ACID STYRYL) BIPHENYL). C.I. Fluorescent Brightener 351 is a photosensitive dye that fluoresces when exposed to ultra violet light. In this image, no fluorescence is detected on the platen edges 12 surrounding any one of the three unit dose pouches 100. Thus, this entire row of pouches passes inspection.

Figure 6:
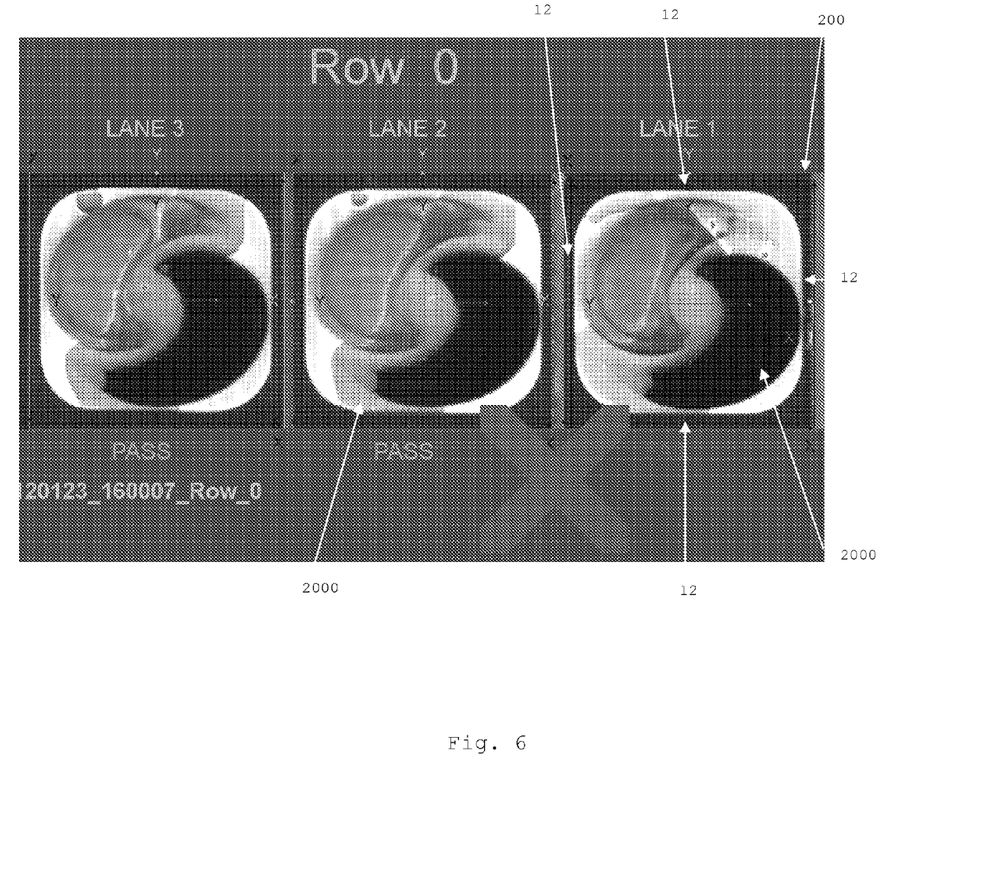
FIG. 6 is a picture of a row of pouches, one of which has failed inspection.

FIG. 6 also shows an image captured by a camera that is located along a unit dose pouch production line 200. The image is of a portion of a platen 10 with three cavities (not visible) which each contain a multi compartment unit dose pouch 100. The platen is exposed to ultraviolet light when the image is captured. The composition 2000 in each of the unit dose pouches 100 is laced with 50 parts per million of C.I. Fluorescent Brightener 351. In this image, fluorescence 150 is detected on the platen edge 12 at the far right in the image. Thus the unit dose pouch 100 at Row R, Lane L contained within the cavity adjacent to the contaminated platen edge is rejected as is the unit dose pouch (not pictured) that is to the right of the first unit dose pouch at Row R, Lane L+1. Thus, each of these two unit dose pouches fail inspection. In this way, both the leaking pouch and the pouch most likely to be contaminated by the leaking composition 2000 are flagged for rejection from the production line.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. An in-line method of rejecting composition-filled pouches having a defect from a pouch converting line, wherein the pouch converting line comprises a platen having a surface, the platen comprising a plurality of pouch cavities in the surface of the platen, wherein each of the pouch cavities is:
   a) surrounded by a plurality of platen edges;
   b) arranged in lanes and rows such that the location of each cavity is defined by a single lane, L disposed between Lane L−1 and Lane L+1, and a single row, R disposed between row R−1 and Row R+1; and
   c) in combination with the plurality of platen edges defines an area comprising at least four zones selected from the group of: Top Zone adjacent to Row R−1; Bottom Zone adjacent to R+1, a Left Zone adjacent to L−1; and a Right Zone adjacent to L+1;
   the method comprising the step of inspecting a first composition-filled pouch located in the cavity at lane, L, row, R for a defect in at least one of the four zones, such that if a defect is detected in:
      i. the Top Zone, the first composition-filled pouch is rejected and a second composition-filled pouch if present in a cavity at Lane, L, row, R−1 is rejected;
      ii. the Bottom Zone, the first composition-filled pouch is rejected and a second composition-filled pouch if present in a cavity at Lane, L, row R+1 is rejected;
      iii. the Left Zone, the first composition-filled pouch is rejected and a second composition-filled pouch if present in a cavity at Lane, L−1, row, R is rejected;
      iv. the Right Zone, the first composition-filled pouch is rejected and a second composition-filled pouch if present in a cavity at Lane, L+1, row, R is rejected.
   wherein the defect is leakage of the composition from the first composition-filled pouch, wherein the composition is selected from the group consisting of: liquid; gel; solid; power; and combinations thereof.

2. The method of claim 1, wherein the composition is selected from the group consisting of: light duty liquid detergent compositions; heavy duty liquid detergent compositions; hard surface cleaning compositions; detergent gels; bleach and laundry additives; shampoos and body washes.

3. The method of claim 1, wherein the composition comprises a photosensitive agent.

4. The method of claim 3, wherein the photosensitive agent is a fluorescent agent.

5. The method of claim 4, wherein the fluorescent agent is C.I. Fluorescent Brightener 351.

6. The method of claim 1, wherein the defect is detected in at least two of the Zones and two second composition-filled pouches are rejected.

* * * * *

UNITED STATES PATENT AND TRADEMARK OFFICE
CERTIFICATE OF CORRECTION

| | | |
|---|---|---|
| PATENT NO. | : 9,233,768 B2 | Page 1 of 1 |
| APPLICATION NO. | : 13/406127 | |
| DATED | : January 12, 2016 | |
| INVENTOR(S) | : Stefan Meskens et al. | |

It is certified that error appears in the above-identified patent and that said Letters Patent is hereby corrected as shown below:

Claims

Claim 1, line 17, after the word "inspecting" insert -- with a camera --.

Claim 1, line 36, delete "power" and insert -- powder --.

Claim 6, line 3, after the word "pouches" insert -- if present --.

Signed and Sealed this
Nineteenth Day of April, 2016

Michelle K. Lee
*Director of the United States Patent and Trademark Office*